United States Patent [19]

Drake

[11] 4,123,248

[45] Oct. 31, 1978

[54] CONTROLLED RELEASE FERTILIZER

[75] Inventor: Cyril F. Drake, Harlow, England

[73] Assignee: International Standard Electric Corporation, New York, N.Y.

[21] Appl. No.: 827,469

[22] Filed: Aug. 25, 1977

[51] Int. Cl.$^2$ .................. C05B 17/00; C05B 19/00
[52] U.S. Cl. ......................................... 71/4; 71/32; 71/49; 71/64 F; 71/64 G; 106/47 R
[58] Field of Search ............. 71/64 G, 64 F, 64 D, 71/64 DC, 32, 48, 49, 4; 128/260; 47/59; 106/47 R; 119/1

[56] References Cited

U.S. PATENT DOCUMENTS

| | | | |
|---|---|---|---|
| 973,019 | 10/1910 | D'Ercole | 71/32 X |
| 2,192,939 | 3/1940 | Slayter et al. | 47/9 X |
| 2,732,290 | 1/1956 | Vara et al. | 71/64 G X |
| 2,806,773 | 9/1957 | Pole | 71/64 G X |
| 3,441,400 | 4/1969 | Otrhalek | 71/64 G X |
| 3,624,692 | 11/1971 | Lux | 47/59 X |
| 3,672,945 | 6/1972 | Taylor | 71/64 G X |
| 3,762,909 | 10/1973 | Davie et al. | 71/64 G X |
| 3,958,973 | 5/1976 | Roberts | 71/64 G |

Primary Examiner—Kenneth M. Schor
Attorney, Agent, or Firm—James B. Raden; Harold J. Holt

[57] ABSTRACT

A biologically active slow release medium consisting of vitreous matrix including one or more water soluble biologically active constituents together with phosphorus pentoxide which vitreous matrix may include one or more dispersed phases, the vitreous matrix having a slow rate of solution in water, such that when the medium is immersed in water biologically active constituents are slowly released into solution. Nitrogen releasing material is also incorporated into the vitreous (glass) matrix, using an inorganic material that can be added to a melt of the glass to be formed.

11 Claims, No Drawings

CONTROLLED RELEASE FERTILIZER

This invention relates to biologically active slow release media in which one or more biologically active constituents are released into aqueous solution from a solid phase over an extended period.

For the purpose of this specification the constituents of a glass will be referred to by their oxides, but this is not meant to imply either that they exist in this form in the glass, nor is it meant to imply that the constituents are necessarily added to the glass batch in their oxide form.

According to the present invention there is provided a biologically active slow release medium consisting of vitreous matrix including one or more water soluble biologically active constituents together with phosphorus pentoxide which vitreous matrix may include one or more dispersed phases the vitreous matrix having a slow rate of solution in water such that when the medium is immersed in water biologically active constituents are slowly released into solution.

Conveniently, the rate of solution of a phosphate glass can be lowered to a suitable value for a slow release reagent by the incorporation of calcium oxide into the glass. It is to be understood however that alternative oxides such as silica, alumina, or oxide of iron can be employed to achieve an equivalent lowering of the rate of solution.

One application of the invention is in the provision of a vitreous matrix containing trace minerals for use as a subcutaneous implant for livestock, such as sheep and cattle, pastured in mineral deficient regions. The composition of the vitreous matrix is chosen to give a rate of solution that will release the required trace elements in their appropriate proportions into the blood stream at the required rate.

Another applicaton of the invention is in the provision of slow release fertilizers. A fertilizer that does not have any provision for obtaining controlled release is liable to a number of disadvantages. Thus in dry soils the plants are liable to damage by excessive nutrient concentrations, while in wet conditions the nutrients are liable to be wasted as a result of being removed from the region of the soil in the neighborhood of the plants roots. In wet conditions there is the further disadvantage that the leaching is liable to produce pollution of adjacent water courses. These risks may be partially ameliorated by recourse to more frequent lighter applications of fertilizer, but this increases the application cost. A particular feature of a slow release fertilizer is that relatively large concentrations of fertilizer can be applied at or before the seeding stage in spite of the susceptibility of seedlings to high concentrations of normal immediately assimilable fertilizer.

As applied to fertilizers, a vitreous matrix can readily be made of all the commonly used nutrients and trace elements with the exception of nitrogen. Such a matrix is based on phosphorus pentoxide as a glass former and typically uses calcium oxide as a glass modifier, and incorporates the other nutrients and trace elements in their oxide form. Nitrogen cannot be incorporated in this form, but can be incorporated in the form of a suitable compound, such as calcium cyanamide, or a hydrocyanic acid polyer. Calcium cyanamide is available in commercial form mixed with carbon and a small proportion of quicklime (in the form $x \, Ca \, CN_2 + xC + y \, CaO$ where $y/x = 0.1$), and has been used in Europe in fertilizer as a source of nitrogen. So far in our fertilizer formulations we have not been able to determine whether or not calcium cyanamide becomes incorporated as part of the vitreous phase or whether it continues to exist as a separate non-vitreous phase. In the case of the commercial calcium cyanamide it is, at least, unlikely that any of the carbon is incorporated into the vitreous phase.

The vitreous phase may contain not only the normal major elements of mixed fertilizers, such as potassium, magnesium, phosphorus, and calcium, but also small quantities of trace elements, such as iron, boron, manganese, sulphur, vanadium, copper, cobalt, zinc, and molybdenum. Normally, the trace elements are incorporated at not more than 1 wt% in aggregate.

The absolute rate of dissolution, $R$, $(ug \cdot g^{-1} \cdot day^{-1})$ of a particular fertilizer formulation is equal to the product $r \cdot A$ where A is the surface area per gram determined by the particle size distribution function and $r$ is the release rate coefficient $(ug \cdot cm^{-2} \cdot day^{-1})$ determined by the chemical composition of the vitreous phase. It is thus possible to arrange for a continuous, and more or less uniform, release over any period from a few days to many years. A variety of chemical factors have significant effect upon the release rate coefficient. These include the cation/phosphorus pentoxide ratio, the alkali/alkaline earth oxides ratio and the presence or absence of silica and alumina. In the case of the cation/phosphorus pentoxide ratio, the rate of dissolution is high near 100% $P_2O_5$, passes through a minimum near 85% $P_2O_5$, and a secondary maximum near 60% $P_2O_5$. The relationship in the case of the alkali/alkaline earth oxides ratio is that the rate of release is reduced with increasing alkaline earth oxide concentration. Alumina, silica and oxide of iron all have the effect of reducing the rate of release.

Normally, the chemical composition of a slow release fertilizer will be determined by relative quantities of the constituents that are required to be released for the specific purpose of the fertilizer. This wll give a rate of release which can then be altered by changing the composition with biologically neutral constituents such as alumina and silica for slowing down the release rate, and soda for increasing it. In this context it will be appreciated that for certain crops, such as sugar beet, the demand for soda is so great that a fertilizer is required to release soda, and, under these particular circumstances, soda connot properly be considered as a biologically neutral ingredient of the fertilizer.

In order to match the specific requirements of a particular crop it may be desirable to mix slow release fertilizer powders of different chemical compositions and particle size distributions so that the pattern of release changes with time.

One desirable attribute for many applications involving young plants, seedlings or saplings, is a slow release fertilizer that possesses an induction period preceding the release period. During the induction period little or no fertilizer is released and hence the plants are enabled to progress through a stage at which they are particularly susceptible to damage from assimilating excessive quantities of nutrient. A convenient way of providing this induction period is to subject the fertilizer powder to a borating treatment. The principal or sole glass former of the vitreous matrix is phosphorus pentoxide and hence the powder particles can be rendered initially much less soluble in water by treating them with boric oxide to form a thin very slowly water soluble surface layer of boron phosphate on each powder particle. Typically the thickness of this surface layer lies between 0.1 to 1.0 um, and is created by heating the powder to a temperature below its softening point and exposing the heated powder to boric oxide vapour. The actual thickness required in any particular instance is determined by the length of induction period required. For instance, in some forestry applications a one year induction period is required, whereas for most crops a considerably shorter induction period is necessary.

If the slow release fertilizer is to release nitrogen, all the ingredients, other than the nitrogen releasing ingredient, are mixed together and fused to form a base glass to which the nitrogen releasing agent is added at a later stage. The base glass is prepared by conventional glass preparation techniques, usually involving temperatures in the range 1000°-1300° C., but normally the nitrogen releasing ingredient or ingredients must be incorporated into the glass at as low a temperature as possible in order to prevent them from decomposing under the action of heat. In the case of calcium cyanamide the temperature msut be kept significantly below 1200° C. This is not only to avoid the problems of thermal decomposition, but also to avoid excessive attack by the base glass if that glass should be either acidic or strongly alkaline.

It has been found that commercial grade calcium cyanamide can be incorporated in a $K_2O:CaO:MgO:Na_2O$ phosphate glass by heating the glass to a temperature of about 800° C., at which it is possible to stir the melt, and then stirring in the calcium cyanamide in a nitrogen atmosphere conveniently at atmospheric pressure. The amount of cyanamide that can be incorporated in this way is primarily limited by the resulting stiffness of the mix. Typically, the cyanamide can be incorporated by this method at a concentration of about 20 wt.% of cyanamide.

A quantity of such a mixture has been cast, ground to a suitable particle size, and then analysed for nitrogen content by boiling the material for some hours in a 1% aqueous solution of sulphuric acid and measuring the concentration of resulting ammonium ion. In the soil the nitrogen content of the cyanamide is converted, presumably by microbiological processes, into nitrate compounds that can be assimilated by plant life. However, estimated in terms of ammonia, the fertilizer is revealed to contain about 10 wt.% nitrogen.

It is possible to increase the nitrogen content by incorporating the cyanamide into the base at a higher temperature, and optionally to perform this under higher than atmospheric pressure of nitrogen. A further way of increasing the nitrogen content is to coat the cyanamide particles with a low melting point neutral metaphosphate glass layer prior to their incorporation into the base glass. This metaphosphate glass acts as a buffer protecting the cyanamide from chemical attack at the higher temperatures by the base glass. By incorporating a coated cyanamide powder into a base glass at a temperature in the range 900°-920° C. it has been found possible to produce fertilizer containing up to 15% nitrogen. In this instance the cyanamide was first incorporated into a melt of the metaphosphate glass, then this was cooled and pulverized, and finally the pulverized material was incorporated into a melt of the fertilizer base glass at 900°-920° C. The metaphosphate glass was less viscous at 800° C. than the base and so could accept cyanamide, and then the base glass was less viscous at the higher temperature and so could accept more of the coated cyanamide.

A slow release fertilizer may also include active constituents other than plant nutrients. For instance, for fertilizing a fodder crop, it can be desirable to include trace minerals, such as iodine (added e.g. as potassium iodide) and cobalt (added as oxide), to be taken up into the fodder for later ingestion by livestock. Inorganic fungicides such as mercury, arsenic, copper, and silver may also be included in small quantities, preferably incorporated in their oxide form as constituents of the glass.

Included among the slow release fertilizer formulations may be ones designed specifically for hydroponics systems of agriculture. In these instances the fertilizer may also function as the aerating bed. In hydroponic culture this use of a slow release fertilizer reduces the frequency at which the hydroponic solution requires to be replenished with nutrients.

The ensuing specific examples of the invention, which illustrate how the release rate is affected by glass composition, have been prepared using laboratory reagents rather than commercial grade material. An exception to this is the calcium cyanamide. For commercial scale production it is unlikely that phosphorus pentoxide would be used, but rather natural phosphate rock. For many compositions the calcium phosphate of phosphate rock would need to be supplemented with commercially available alkali phosphate, and possibly ammonium phsophate, in order to limit the calcium in concentration of the glass. It may be noted however that the ammonium phosphate cannot be expected to contribute to the nitrogen content of the final fertilizer because in the making of the glass a temperature typically in the region 1000°-1300° C. will be required, and this is high enough for ammonium phosphate to be decomposed and ammonia evolved. Any additional alkali metal oxide concentration is conveniently supplied in the form of carbonates. Sulphates could be used, but most of the sulphur would be lost during the glass preparation by the evolution of sulphur dioxide. Additional calcium oxide and magnesia are also conveniently supplied in the form of carbonates. If magnesia and calcium oxide have both to be added, at least a proportion of the addition may be in the form of dolomite.

To illustrate the effects of changes in composition of the base nutrient glass a number of compositions, listed in the ensuing table, were prepared and their solution rates recorded.

| Composition No. | $K_2O$ (mole %) | MgO & CaO (mole %) | $P_2O_5$ (mole %) | Solution rate (μg/ml) |
|---|---|---|---|---|
| 1 | 35 | 22 | 42 | 2600 |
| 2 | 22 | 22 | 44 | 43 |
| 3 | 11 | 44 | 46 | 13 |
| 4 | 13 | 50 | 37 | 8 |
| 5 | 28 | 18 | 53 | 88 |
| 6 | 28 | 18 | 54 | 62 |
| 7 | 18 | 27 | 55 | 9 |
| 8 | 30 | 20 | 50 | 130 |
| 9 | 20 | 30 | 50 | 50 |
| 10 | 10 | 40 | 50 | 19 |
| 11 | 33 | 22 | 44 | 570 |

The solution rate figures are quoted in ug/ml of potassium ion obtained when 0.2 gm. of glass of 500-1000 um. particle size leach with 10 ml. water for 30 hours at room temperature.

A nitrogen containing slow release fertilizer was made by incorporating 9 parts by weight of commercial grade calcium cyanamide in 11 parts by weight of metaphosphate glass having the composition $Na_{0.504}(PO_3)_{0.496}$. This was pulverized and 3 parts by weight of the resulting powder was incorporated in 2 parts by weight of a glass having the composition $K_2O \cdot CaO \cdot (P_2O_5)_2$. The resulting fertilizer was analyzed and found to have 17.4% N (estimated as $NH_3$)
34% $M_2O$ (Na + K)
48% $P_2O_5$.

The composition was thus found to have a fertilizer KPN of 2:3:1.

It is to be understood that the foregoing description of specific examples of this invention is made by way of example only and is not to be considered as a limitation on its scope.

I claim:

1. A slow release fertilizer composition comprising a vitreous matrix including a water soluble nitrogen source fertilizer material, a glass modifier, and as a glass former, phosphorous pentoxide, all within the matrix; the vitreous matrix including one or more inorganic oxide phases dispersed therein, the vitreous matrix having a low rate of solution in water such that when the composition is immersed in water the fertilizer is slowly released into solution, wherein said nitrogen source fertilizer material is an inorganic nitrogen containing compound stable at the fusing temperature of the glass being formed.

2. A fertilizer composition as claimed in claim 1 wherein the nitrogen source included in the fertilizer composition is calcium cyanamide.

3. A fertilizer composition as claimed in claim 1 wherein the nitrogen source included in the fertilizer composition is a hydrocyanic acid polymer.

4. A fertilizer composition as claimed in claim 1 wherein the nitrogen containing constituent is present in powder form, at least some of the particles of which are buffered from the vitreous matrix by a lower melting point metaphosphate coating.

5. A fertilizer composition as claimed in claim 1 wherein the fertilizer composition contains trace nutrient elements.

6. A fertilizer composition as claimed in claim 1 wherein the fertilizer composition contains one or more trace elements that are assimilable in plants which when eaten by livestock are biologically active in the prevention of deficiency diseases.

7. A fertilizer composition as claimed in claim 1 wherein the fertilizer composition contains one or more inorganic fungicides.

8. A fertilizer composition as claimed in claim 1 which is in powder form for application as a fertilizer.

9. A fertilizer powder as claimed in claim 8 which is a blend of two or more fertilizer compositions.

10. A fertilizer powder as claimed in claim 9 wherein the powder comprises particles which have a surface coating of boron phosphate.

11. A method of treatment of growing plants which method includes the application to the soil in which the plants are growing of a fertilizer as claimed in claim 8.